US011849022B2

(12) United States Patent
Davis et al.

(10) Patent No.: US 11,849,022 B2
(45) Date of Patent: *Dec. 19, 2023

(54) METHOD AND SYSTEM FOR DISTRIBUTION OF A CONSISTENT LEDGER ACROSS MULTIPLE BLOCKCHAINS

(71) Applicant: Mastercard International Incorporated, Purchase, NY (US)

(72) Inventors: Steven C. Davis, Saint Peters, MO (US); Rakesh Yadav, Cape Elizabeth, ME (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,514

(22) Filed: Jul. 27, 2022

(65) Prior Publication Data

US 2022/0360430 A1   Nov. 10, 2022

Related U.S. Application Data

(63) Continuation of application No. 16/576,915, filed on Sep. 20, 2019, now Pat. No. 11,431,473.

(51) Int. Cl.
*H04L 9/06* (2006.01)
*H04L 9/00* (2022.01)

(52) U.S. Cl.
CPC .......... *H04L 9/0637* (2013.01); *H04L 9/0643* (2013.01); *H04L 9/50* (2022.05); *H04L 2209/56* (2013.01)

(58) Field of Classification Search
CPC ....... H04L 9/0637; H04L 9/0643; H04L 9/50; H04L 2209/56; H04L 9/3297;
(Continued)

(56) References Cited

U.S. PATENT DOCUMENTS 9,608,829 B2 *   3/2017   Spanos ................. H04L 9/3268
10,158,611 B2   12/2018   Castagna
(Continued)

FOREIGN PATENT DOCUMENTS

CN   108833084 A   11/2018
CN   108881387 A   11/2018
(Continued)

OTHER PUBLICATIONS

U.S. Appl. No. 16/221,992, entitled "Method and System for Consent to Time-Bound Queries in a Blockchain," by Rakesh Yadav et al., filed Dec. 17, 2018.
(Continued)

*Primary Examiner* — Taghi T Arani
*Assistant Examiner* — Blake I Narramore
(74) *Attorney, Agent, or Firm* — Panitch Schwarze Belisario & Nadel LLP

(57) ABSTRACT

A method for maintaining a consistent blockchain ledger for storing commitments across multiple separate blockchains includes: storing a blockchain comprised of a plurality of blocks, each block including at least a block header and one or more blockchain data values; receiving a base commitment from a first node, where the first node is included in a first blockchain network; generating a first new block including at least a first block header and the received base commitment; storing the first new block in the blockchain; receiving a state commitment from an additional node included in each of at least two additional blockchain networks; generating an additional new block including at least an additional block header and each received state commitment; and storing the additional new block in the blockchain.

20 Claims, 5 Drawing Sheets

(58) Field of Classification Search
CPC ... H04L 9/3239; H04L 67/1097; H04L 69/22; G06Q 20/065
See application file for complete search history.

(56) References Cited

U.S. PATENT DOCUMENTS

| | | | | |
|---|---|---|---|---|
| 2016/0275461 | A1* | 9/2016 | Sprague | H04W 12/06 |
| 2016/0371679 | A1* | 12/2016 | Goto | G06Q 20/367 |
| 2017/0046652 | A1* | 2/2017 | Haldenby | G06F 21/645 |
| 2017/0132626 | A1* | 5/2017 | Kennedy | G06Q 20/065 |
| 2017/0220815 | A1* | 8/2017 | Ansari | G06Q 20/389 |
| 2017/0338947 | A1* | 11/2017 | Ateniese | H04L 9/14 |
| 2018/0019867 | A1 | 1/2018 | Davis | |
| 2018/0337847 | A1 | 11/2018 | Li et al. | |
| 2019/0253259 | A1* | 8/2019 | Qiu | H04L 9/3239 |
| 2019/0340361 | A1* | 11/2019 | Daniel | G06F 21/57 |
| 2020/0092362 | A1* | 3/2020 | Viswanathan | H04L 67/1095 |
| 2020/0167773 | A1* | 5/2020 | Cervenka | G06Q 20/10 |
| 2020/0177387 | A1* | 6/2020 | Qiu | H04L 9/3247 |
| 2021/0026971 | A1* | 1/2021 | Hellwig | H04L 9/008 |
| 2021/0065469 | A1* | 3/2021 | Dutta | G07C 5/0808 |

FOREIGN PATENT DOCUMENTS

| | | | | |
|---|---|---|---|---|
| WO | 2018/226868 | A1 | 12/2018 | |
| WO | WO-2018226868 | A1 * | 12/2018 | G06F 16/27 |

OTHER PUBLICATIONS

International Search Report (Form PCT/ISA/210) and the Written Opinion of the International Searching Authority (Form PCT/ISA/237) dated Oct. 29, 2020, by the Federal Institute of Industrial Property in corresponding International Application No. PCT/US2020/046295. (6 pages).

Worley et al, "Blockchain Tradeoffs and Challenges for Current and Emerging Applications: Generalization, Fragmentation, Sidechains, and Scalability", 2018 IEEE Conf on Internet of Things, Green Computing and Communications, Cyber, Physical and Social Computing, Smart Data, Blockchain, Computer and Information Technology, Congress on Cybermatics, Jul. 30, 2018, pp. 1582-1587.

Extended European Search Report, dated Sep. 11, 2023, issued in corresponding European Application No. 20865715.5-1218, 10 pgs.

* cited by examiner

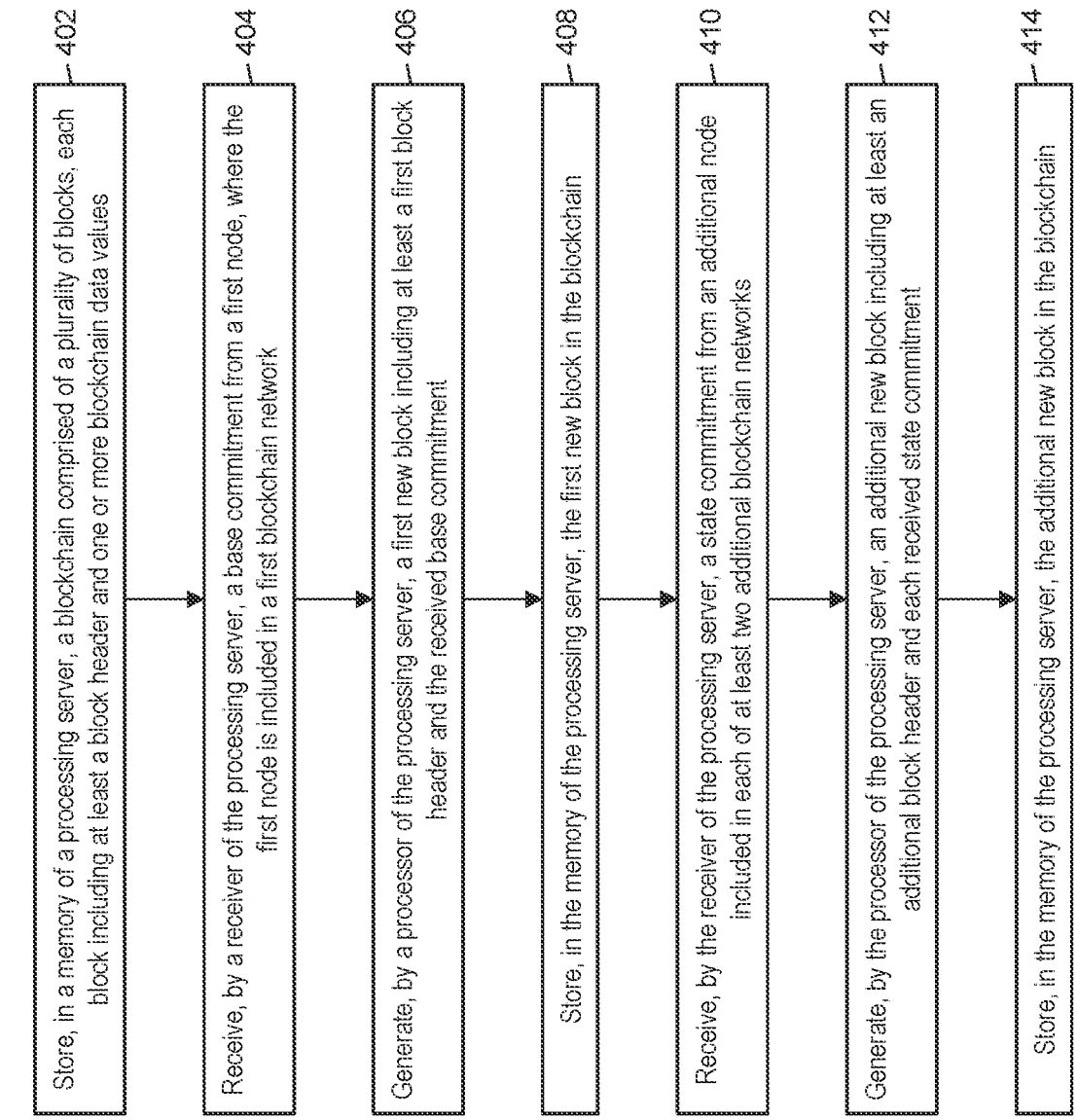

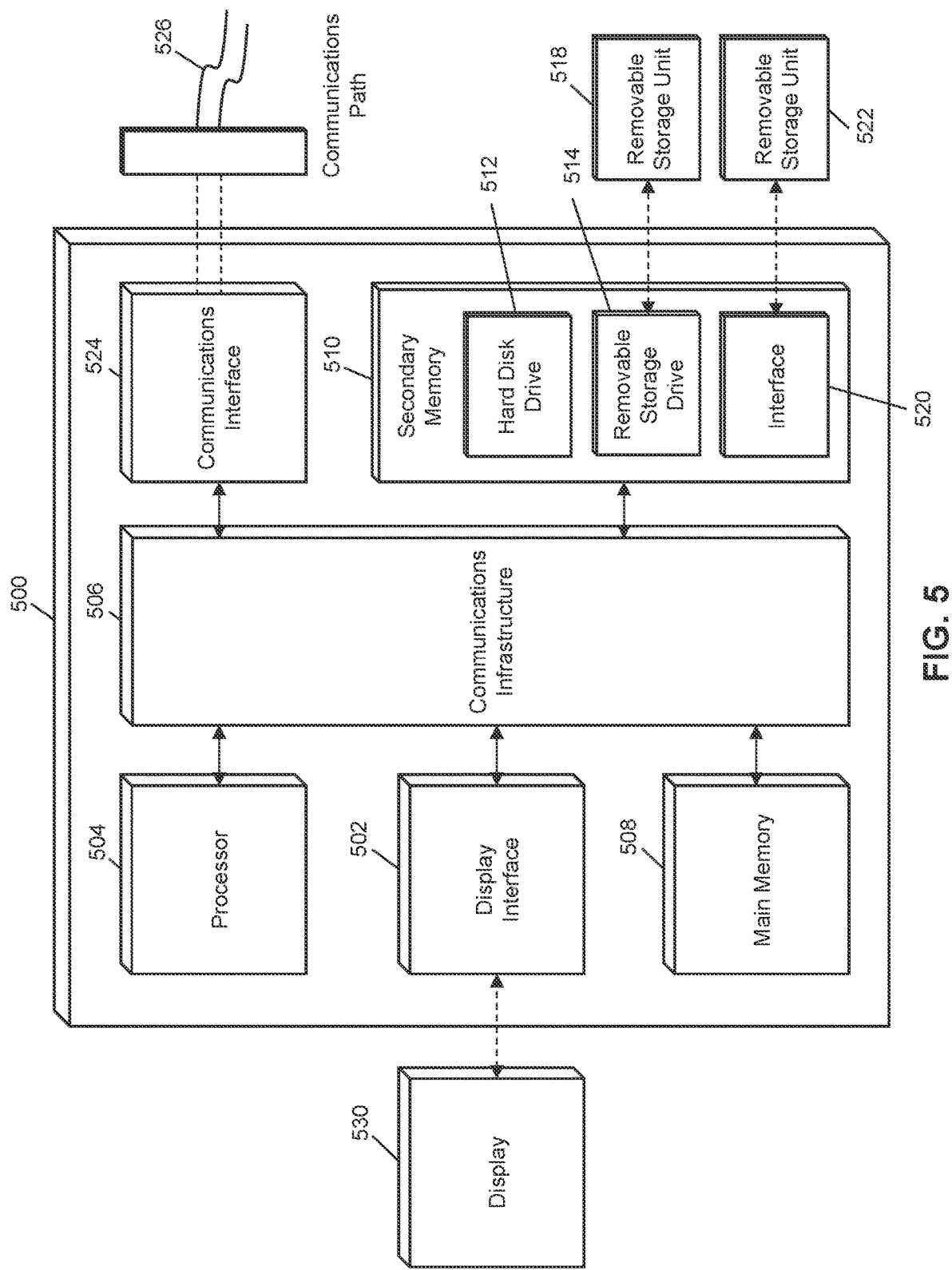

METHOD AND SYSTEM FOR DISTRIBUTION OF A CONSISTENT LEDGER ACROSS MULTIPLE BLOCKCHAINS

FIELD

The present disclosure relates to maintaining a consistent blockchain ledger for storing commitments across multiple, separate blockchains, specifically the maintenance of a global ledger that serves as an immutable ledger of the state of multiple separate and distinct blockchains.

BACKGROUND

Blockchains are often associated with cryptographic currency, but have applications that can go well beyond the transfer of currency and other financial transactions. For instance, blockchains have been used to assist in voting, storing land deed information, tracking the provenance of diamonds and other luxury products, and internally by many organizations and entities as a more sophisticated storage solution. In many cases, blockchains are used because they provide an immutable and auditable record, as the data stored therein cannot be changed as new blocks are added by virtue of how the generation and addition of new blocks operates.

Typically, when a blockchain is used as part of a solution to a problem, the blockchain is designed and formatted to address the problem being solves. As a result, two blockchains that are created to solve problems, even similar problems, can be vastly different in terms of formatting. Because of the differences in formatting and lack of standardization across blockchains, it can be difficult for an entity to keep track of multiple blockchains. The ability for such tracking can be increasingly important in cases where multiple blockchains are storing common data, such as if currency or some other value is split across multiple blockchains. In such cases, an entity may be interested or required to maintain a record of the value being stored in each blockchain. However, there is currently no mechanism available to entities for such a record. Thus, there is a need for a technical system that can maintain a consistent ledger across multiple blockchains, in particular a system that is agnostic as to the blockchains and their format, such that the solution could be applied to multiple types of blockchains and data stored therein.

SUMMARY

The present disclosure provides a description of systems and methods for maintaining a consistent ledger across multiple separate blockchains. A global ledger receives a base commitment from a node in a first blockchain network, where the base commitment references a transmission of data to multiple, separate blockchain networks. The global ledger then receives state commitments from each of the multiple, separate blockchain networks at predetermined periods of time. Each time state commitments are received, they are stored in a new block in the global ledger. This way, any distributed value can be tracked and where it resides monitored via use of the state commitments. In some embodiments, the state commitments may be hashes of the most recent block or block header for the respective blockchain, which results in the global ledger having an auditable record of each of the blockchains without also revealing any information about the blockchain itself. Thus, even private blockchains can participate in the system and all information kept private, while still having an auditable record of the status of each blockchain maintained. Thus, the solution is blockchain-agnostic and infinitely scalable, while still providing a solution to the problem of maintaining a consistent record for any number of blockchains.

A method for maintaining a consistent blockchain ledger for storing commitments across multiple separate blockchains includes: storing, in a memory of a processing server, a blockchain comprised of a plurality of blocks, each block including at least a block header and one or more blockchain data values; receiving, by a receiver of the processing server, a base commitment from a first node, where the first node is included in a first blockchain network; generating, by a processor of the processing server, a first new block including at least a first block header and the received base commitment; storing, in the memory of the processing server, the first new block in the blockchain; receiving, by the receiver of the processing server, a state commitment from an additional node included in each of at least two additional blockchain networks; generating, by the processor of the processing server, an additional new block including at least an additional block header and each received state commitment; and storing, in the memory of the processing server, the additional new block in the blockchain.

A system for maintaining a consistent blockchain ledger for storing commitments across multiple separate blockchains includes a processing server, a first node included in a first blockchain network, and at least two additional blockchain networks, each including an additional node, wherein the processing server includes: a memory storing a blockchain comprised of a plurality of blocks, each block including at least a block header and one or more blockchain data values; a receiver receiving a base commitment from a first node; and a processor generating a first new block including at least a first block header and the received base commitment, wherein the memory of the processing server further stores the first new block in the blockchain, the receiver further receives a state commitment from the additional node included in each of at least two additional blockchain networks, the processor further generates an additional new block including at least an additional block header and each received state commitment, and the memory further stores the additional new block in the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a flow chart illustrating an exemplary method for maintaining a consistent blockchain ledger for storing commitments across multiple separate blockchains in accordance with exemplary embodiments.

FIG. 5 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Maintaining a Consistent, Global Blockchain Ledger

Figure 1:
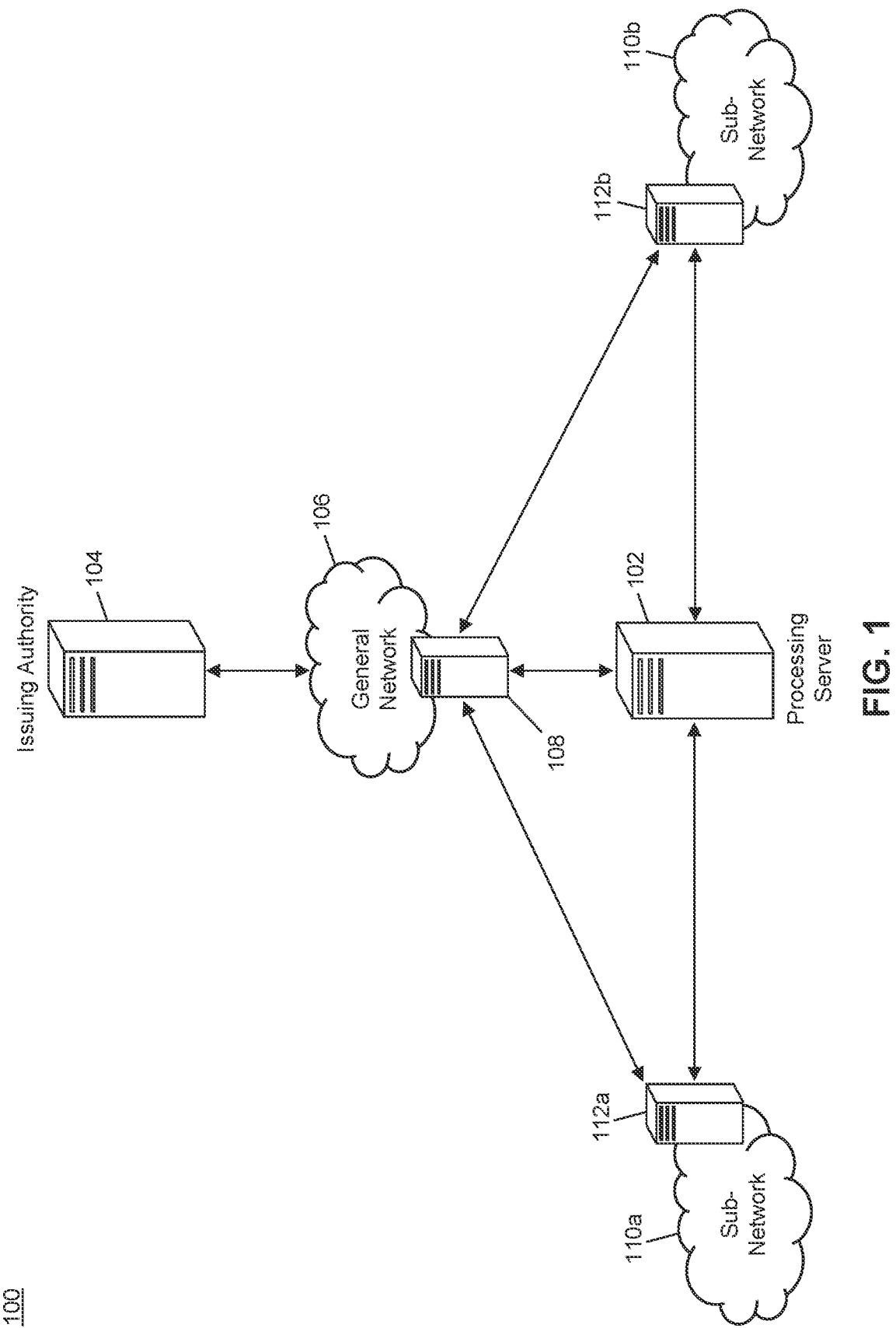
FIG. 1 is a block diagram illustrating a high level system architecture for maintaining a consistent blockchain ledger across multiple blockchains in accordance with exemplary embodiments.

FIG. 1 illustrates a system 100 for the operation and maintenance of a global blockchain ledger that provides for consistency across a plurality of different blockchains operated via separate and distinct blockchain networks.

Figure 2:
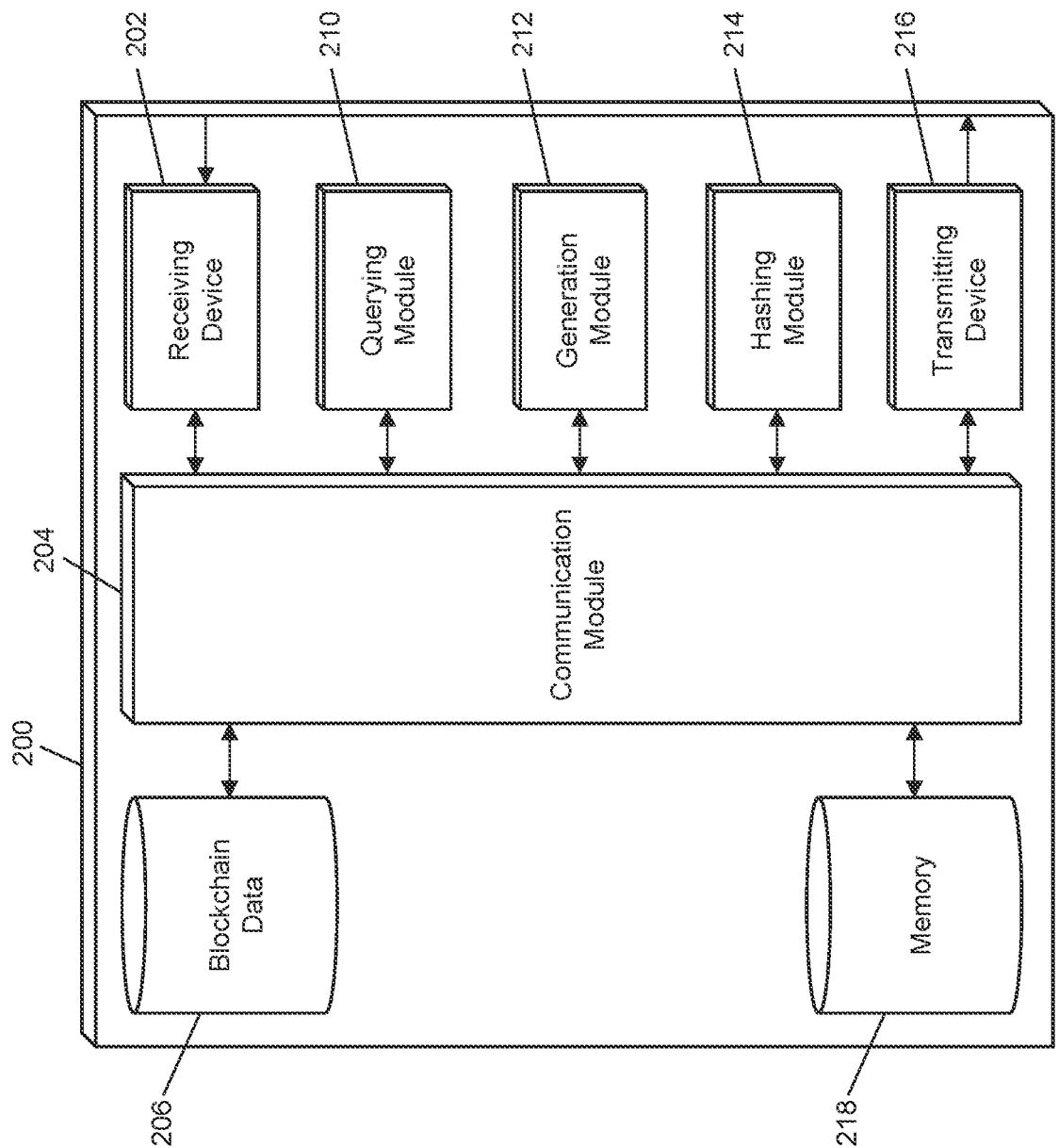
FIG. 2 is a block diagram illustrating the processing server of the system of FIG. 1 for maintaining a consistent blockchain ledger in accordance with exemplary embodiments.

The system 100 may include a processing server 102. The processing server 102 may be a node in a blockchain network that maintains a global blockchain ledger, referred to herein as the "global ledger" or "global blockchain," where the global ledger stores commitments for a plurality of different blockchains that are separate and distinct from one another. A blockchain network may be comprised of a plurality of blockchain nodes. Each node may be a computing system, such as illustrated in FIGS. 2 and/or 5 discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

A blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

Blockchain data values included in a block in a blockchain are traditionally used to store data, where the type of data stored therein may vary based on the purpose and use of the blockchain. For instance, blockchains used for cryptocurrency will have transactional data stored in the blockchain data values, such as recipient addresses, sending addresses, amounts of currency being transferred, references to past transactions, etc. In another example, in a blockchain used to store land deed information, the blockchain data values may store identifiers for land deeds and ownership data associated therewith. In the system 100, the blockchain data values stored in the separate and distinct blockchains, for which the processing server 102 maintains a consistent global ledger, can store any type of data in any type of format, where each separate blockchain may store different kinds of data in different formats from other blockchains whose status is maintained in the global ledger.

The system 100 may include an issuing authority 104. The issuing authority 104 may be an entity that is distributing value across multiple blockchain networks whose status will be maintained in the global ledger, illustrated in FIG. 1 as sub-networks 110. The issuing authority 104 may be, for instance, a financial institution that is issuing currency to entities that operate each of the sub-networks 110, an enterprise service that is issuing software licenses to entities that operate the sub-networks 110, or any other entity that distributes value to multiple entities that may each operate or be otherwise associated with a sub-network 110. As an example, in the system 100, the issuing authority 104 may be a financial institution that is issuing 100 units of currency C, where 50 units of C will be distributed to each of the sub-networks 110a and 110b.

The initial value that is being distributed across the multiple sub-networks 110 may be stored in a general blockchain ledger, referred to herein as a "general ledger," such as may be maintained by a general network 106. The general network 106 may be a blockchain network that is comprised of a plurality of general nodes 108. The general ledger may be a blockchain that stores data regarding the issuance and transfer of the value that the issuing authority 104 wants to distribute to the sub-networks 110. In the above example, the general ledger may be a blockchain that stores transfers of the currency C. For instance, the issuing authority 104 may have the 100 units of currency C that they want to distribute to the two sub-networks 110. In such an example, the general ledger may record two transactions by the issuing authority 104 where they split the 100 units of currency C into two groups of 50 units, such that each group may be distributed to the appropriate sub-network 110. The general ledger may store this transactional data using traditional blockchain functionality.

The issuing authority 104 may, through the general network 106 and its general nodes 108, issue the value to each of the sub-networks 110 through sub-network nodes 112 thereof. In some cases, a sub-network node 112 may be a system of the entity to which the value is being distributed, where the entity's system may maintain and operate the blockchain for the sub-network 110. In an exemplary embodiment, the number of sub-network nodes 112, architecture of the sub-network 110, type of blockchain (e.g., public, private, permissioned, etc.) may be of no consequence to the issuing authority 104, general network 106, or processing server 102. In other words, the sub-network 110a may be a private blockchain operated by a single sub-network node 112a, while the sub-network 110b may be a public blockchain maintained by over one thousand sub-network nodes 112b without affecting how the issuing authority 104, general network 106, and processing server 102 operate as discussed herein.

The issuing authority 104 and/or general node 108 may generate a base commitment that represents the issuance event for the issuance of the value to the sub-networks 110. The issuance event may include any aspect(s) of the issuance that is to be stored in the global ledger, where such aspects may be selected as desired by the issuing authority 104, general network 106, processing server 102, sub-networks 110, etc. For instance, the issuance event may include the initial receipt of the 100 units of currency C by the issuing authority 104, the separation of the 100 units into the two groups of 50 units, and the transfer of ownership of each group of 50 units to the respective sub-network entity, or may only include a portion of the above, and/or may include any other additional data as specified by one of the involved entities or systems. In an exemplary embodiment, the base commitment may be a hash of the issuance event, such as where a hashing algorithm is applied to the issuance event to produce a hash value, where the hash value may be the base commitment.

The base commitment may be submitted to the processing server 102 as a node that maintains and operates the global ledger. The base commitment may be included in a new block that is added to the global ledger. Storage of the base commitment means that there is an immutable record of the issuance of the value to each of the sub-networks 110. In the above example, the base commitment is a hash that can be used to verify that each of the sub-networks 110 were issued 50 units of currency C by the issuing authority 104 through the general network 106. As a result, any dispute how many units of currency C were distributed to which entities can be easily resolved by hashing of the relevant data and comparison of the hash with the base commitment stored in the global ledger.

Each of the sub-networks 110 may be free to take any actions with their received value that they desire, with any actions stored in their own respective blockchains. In cases where a sub-network 110 operates a private blockchain, the distribution or transfer of the value in the private blockchain may be performed without any such information being known to anyone unauthorized by the sub-network 110, including the processing server 102, issuing authority 104, or other sub-networks 110. For instance, sub-network 110a may operate a private blockchain and distribute its 50 units of currency C among its sub-network nodes 112a, members, authorized recipients, etc. The sub-network 110b may operate a public blockchain where a series of transactions using the 50 units of currency C are conducted by its participants, with each transaction being transparent on the public blockchain.

The global ledger may be used to maintain consistency regarding the ownership and possession of the value distributed to the sub-networks 110 through state commitments. At predetermined periods of time, each of the sub-networks 110, through a sub-network node 112, may submit a state commitment to the processing server 102 as a node for the network operating the global blockchain ledger. The state commitment may represent the state of the sub-network's blockchain at a specific time (e.g., the predetermined period of time or a specific time in relation thereto). In an exemplary embodiment, the state may be represented by hashing a specific portion of the sub-network's blockchain, such as the application of a hashing algorithm to the block header of the most recent block in the blockchain to generate a hash value, where that hash value serves as the state commitment. In another example, the most recent block itself may be hashed where the resulting hash value is used as the state commitment.

The processing server 102 may receive the state commitments from each of the sub-networks 110 and store the state commitments as blockchain data values in a new block that is generated and added to the global ledger. By storing these state commitments, the ownership and possession of the units of currency C by each sub-network 110 can be verified, if necessary. For instance, if there is a dispute regarding continued ownership of the units of currency C, the sub-network can reveal the block header or other information related to the units of currency C in their blockchain, and provide the block header that was hashed to generate the state commitment, thus proving the stated ownership. In addition, by using hashes for the state commitments, the data stored in the global ledger does not reveal any specific information in the respective sub-networks 110, which would not compromise private blockchains or reveal any information the sub-networks 110 may want to keep private, even if the global ledger is publicly available. In addition, the use of hashes as state commitments can ensure that each sub-network 110 can operate its own blockchain using any format and activity level without affecting operation and maintenance of the global ledger.

While the system 100 in FIG. 1 illustrates two sub-networks 110, there is no theoretical limit to the number of sub-networks 110 that may be included in the global ledger, as the processing server 102 may be able to receive any number of state commitments from any number of sub-networks 110 for inclusion in the global ledger. Furthermore, in some cases, a sub-network 110 may itself be a global blockchain network that operates its own global ledger for its members or a general network 106 in its own system 100. For instance, the sub-network node 112*a* may be a node for a global ledger, where the state commitment that it submits to the processing server 102 may be the hash of the most recent block header in its own global ledger. The nodes in sub-networks for the sub-network 110*a* may also be servers for their own global ledgers, where state commitments provided to the sub-network node 112*a* may themselves be hashes of block headers in a global ledger. In other words, global ledgers could be nested inside other global ledgers and so on, with any number of sub-networks 110 involved at any level, where the only limits may be based on available computational power, network bandwidth, or file size.

In some embodiments, the sub-networks 110 in the system 100 may be enabled to directly exchange the value that was issued thereto with one another. In an exemplary embodiment, the exchange may be performed using an atomic swap. In an atomic swap, the sending sub-network 110 may be prohibited from sending any value that they were not issued. Validation of the ownership of the value being transferred may be performed by the sub-network 110 receiving the value and/or by a third party moderator, which may be the issuing authority 104, a general node 108, or the processing server 102, which can be validated using the initial base commitment for issuance of the value to the sub-network 110. In some embodiments, when an atomic swap is performed, a new base commitment may be generated for the swap that is stored in the global ledger as an updated record for how much value is controlled by each of the sub-networks 110. For instance, in the above example, the sub-network 110*a* may transfer 30 units of currency C to the sub-network 112. In such an example, the new base commitment may reflect ownership of 20 units of currency C by the sub-network 110*a* and 80 units of currency C by the sub-network 110*b*. In another such example, the new base commitment may reflect only the transfer of the 30 units of currency C from the sub-network 110*a* to the sub-network 112*a*.

In some embodiments, the base commitments and state commitments stored in the global ledger may be stored in separate partitions in the global ledger. More information regarding the use of partitions in a blockchain can be found in U.S. patent application Ser. No. 15/211,111, entitled "Method and System for Partitioned Blockchains and Enhanced Privacy for Permissioned blockchains," by Steven Charles Davis, filed on Jul. 15, 2016, which is herein incorporated by reference in its entirety. In such an embodiment, base commitments and state commitments may each be stored in a different subnet that is included in a single block.

In some embodiments, the global ledger may include data regarding auditing and verification of data stored in blockchains of the sub-networks 110. For instance, if a sub-network 110 operates a private blockchain, data regarding proof of regulation, ownership verification, etc. may be collected and stored in the global ledger. Such proof may be provided without sacrificing the privacy and private status of the blockchain through the use of time-bound queries, such as described in U.S. patent application Ser. No. 16/221,992, entitled "Method and System for Consent to Time-Bound Queries in a Blockchain," by Rakesh Yadav et al., filed on Dec. 17, 2018, which is herein incorporated by reference in its entirety. Data collected from such queries may be stored as a separate type of commitment in the global ledger. In cases where partitions are used in the global ledger, such commitments may be stored in its own partition separate from the partitions used for base commitments and state commitments.

The methods and systems discussed herein enable data for a plurality of different sub-networks 110 to be stored in a global ledger that is consistent across all of the plurality of blockchains operated by the sub-networks 110. The use of base and state commitments to maintain the global ledger may ensure that every sub-network 110 can operate its own type of blockchain in a manner where the solution is blockchain-agnostic, where each sub-network 110 could operate a different type of blockchain with a different volume of transactions without affecting operation and success of the global ledger. The solution provided in the methods and systems discussed herein is also scalable and operates for any number of sub-networks 110 and in cases where the sub-networks 110 themselves may operate global ledgers for their own sub-networks and so on. The result is a solution that is scalable both horizontally and vertically that is agnostic to blockchain format and type that provides for a consistent and auditable ledger for the state of every blockchain operated by all of the sub-networks 110 involved in the system 100.

Processing Server

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. In some cases, the general nodes 108 and sub-network nodes 112 in the system 100 may be configured similar to the processing server 102 in FIG. 2 or computer system 500 in FIG. 5, such as including the components illustrated therein.

The processing server 102 may include a receiving device 202. The receiving device 202 may be configured to receive data over one or more networks via one or more network protocols. In some instances, the receiving device 202 may be configured to receive data from general nodes 108, sub-network nodes 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by general nodes 108 that are superimposed or otherwise encoded with base commitments. The receiving device 202 may also be configured to receive data signals electronically transmitted by sub-network nodes 112 that are superimposed or otherwise encoded with state commitments for sub-network blockchains. In cases where additional commitments may be received related to time-bound queries, the receiving device 202 may receive data signals that are superimposed or otherwise encoded therewith, which may be received from sub-network nodes 112 or third party systems, such as regulatory agencies that perform auditing and regulation of the sub-network blockchains.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, generation module 212, hashing module 214, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a querying module 210. The querying module 210 may be configured to execute queries on databases to identify information. The querying module 210 may receive one or more data values or query strings, and may execute a query string based thereon on an indicated database, such as a memory 210 of the processing server 102 to identify information stored therein. The querying module 210 may then output the identified information to an appropriate engine or module of the processing server 102 as necessary. The querying module 210 may, for example, execute a query on blockchain data 206 in the processing server 102 to identify a block header of a most recent block in the global ledger for use thereof in generating a block header for a new block.

The processing server 102 may also include a generation module 212. The generation module 212 may be configured to generate data for use by the processing server 102 in performing the functions discussed herein. The generation module 212 may receive instructions as input, may generate data based on the instructions, and may output the generated data to one or more modules of the processing server 102. For example, the generation module 212 may be configured to generate new block headers, blocks, and other data for use in operating and maintaining the global ledger.

The processing server 102 may also include a hashing module 214. The hashing module 214 may be configured to apply hashing algorithms to data to generate hash values, which may be used in performing the functions of the processing server 102 as discussed herein. The hashing module 214 may receive data as input, may apply one or more hashing algorithms to the data to obtain a hash value, and may output the resulting hash value to another module or engine of the processing server 102. The hashing module 214 may be configured to, for example, hash block headers, hash blockchain data values (e.g., base commitments, state commitments, etc.), and other data as discussed herein.

The processing server 102 may also be configured to store blockchain data 206. The blockchain data 206 may include all data associated with the global ledger and for use thereof in the system 100, including the global ledger itself (e.g., the plurality of blocks comprising the global blockchain ledger) and any other data for use therein. The global ledger may be comprised of a plurality of blocks, where each block includes at least a block header and one or more blockchain data values, the blockchain data values including at least one of a base commitment, state commitment, or comp commitment, which may refer to results of time-bound queries as discussed above.

The processing server 102 may also include a memory 218. The memory 218 may be configured to store data for use by the processing server 102 in performing the functions discussed herein, such as public and private keys, symmetric keys, etc. The memory 218 may be configured to store data using suitable data formatting methods and schema and may be any suitable type of memory, such as read-only memory, random access memory, etc. The memory 218 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 218 may be comprised of or may otherwise include a relational database that utilizes structured query language for the storage, identification, modifying, updating, accessing, etc. of structured data sets stored therein. The memory 218 may be configured to store, for example, cryptographic keys, salts, nonces, communication information for general nodes 108 and sub-network nodes 112, predetermined period of time data for state commitments, etc.

The processing server 102 may also include a transmitting device 224. The transmitting device 224 may be configured to transmit data over one or more networks via one or more network protocols. In some instances, the transmitting device 224 may be configured to transmit data to general nodes 108, sub-network nodes 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to general nodes 108 that may be superimposed or otherwise encoded with requests for base commitment data. The transmitting device 224 may also be configured to electronically transmit data signals to sub-network nodes 112 that are superimposed or otherwise encoded with requests for state commitments, such as may be transmitted at a predetermined period of time. Some transmissions to sub-network nodes 112 may include requests for comp commitments, which may be forwarded to validating entities to perform time-bound queries to confirm compliance with regulations or other validation of blockchain data. In some cases, such validation may only be performed if the sub-network blockchain is a private or permissioned blockchain.

Operation and Maintenance of the Global Blockchain Ledger

Figure 3:
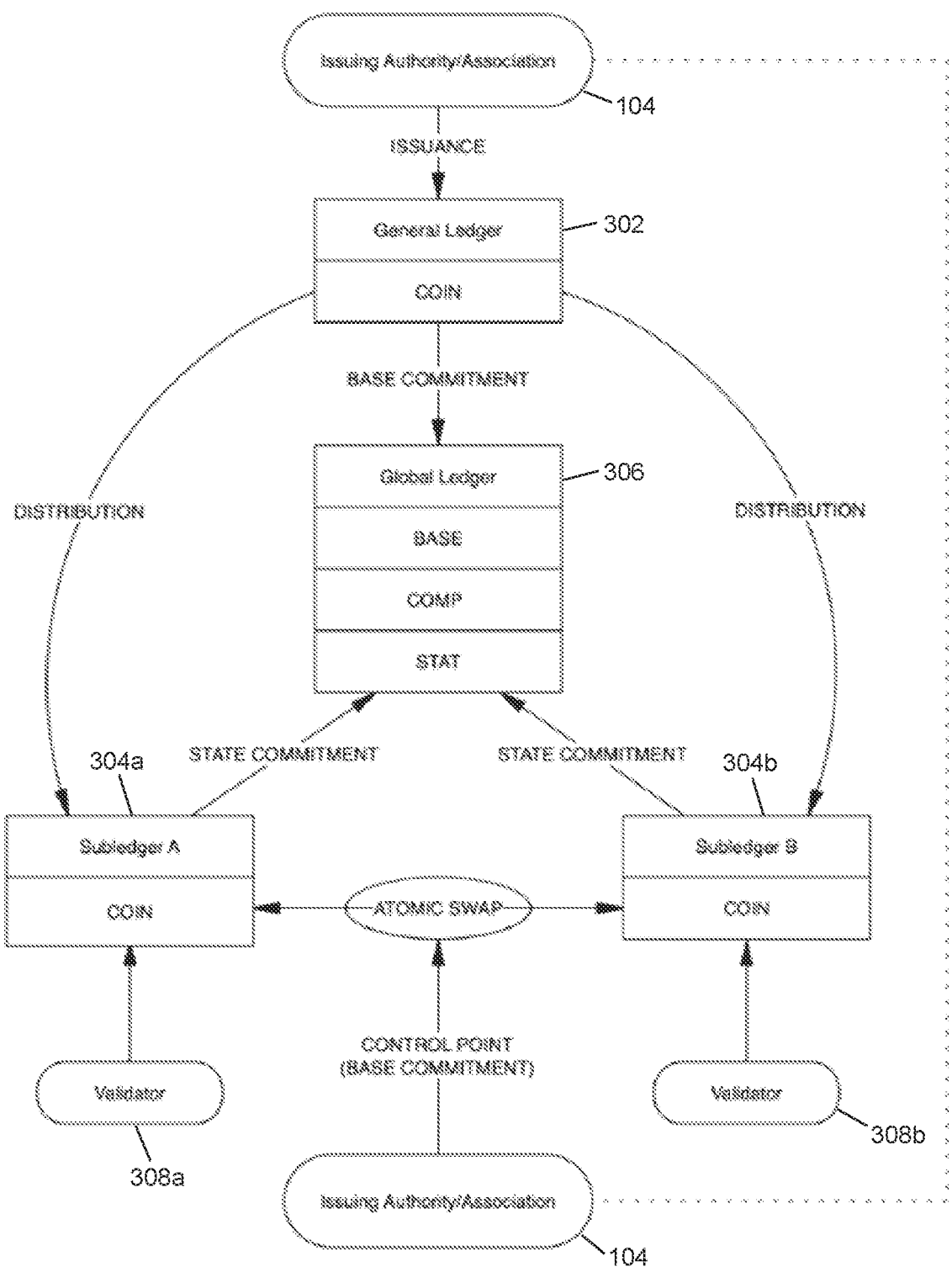
FIG. 3 is a block diagram illustrating the architecture of the global blockchain ledger maintained across multiple blockchains of the system of FIG. 1 in accordance with exemplary embodiments.

FIG. 3 illustrates an example process executed in the system 100 of FIG. 1 for maintaining the consistent global blockchain ledger including the receipt and inclusion of base commitments, comp commitments, and state commitments in the global ledger for two sub-networks 110.

As illustrated in FIG. 3, the issuing authority 104 may perform issuance of value, such as 100 units of COIN, which may be recorded in a general ledger 302, such as operated by the general network 106 in the system 100. The general ledger 302 may store the possession of the 100 units of COIN by the issuing authority 104 as well as the separate of the 100 units of COIN into two groups of 50 units of COIN. The issuing authority 104 may then distribute each of the two groups of 50 units of COIN to the sub-networks 110a and 110b. The general ledger 302 may store data regarding the distribution of the COIN and submit a base commitment for this issuance event to the processing server 102 for storage in a global ledger 306. The global ledger 306 may include a new block where the base commitment may be stored in a BASE partition thereof.

Each of the sub-networks 110 may receive the distributed COIN, which may be stored in and used by their respective subledger 304. At predetermined periods of time, each of the sub-networks 110 may generate a state commitment that is representative of the state of their subledger 304, such as by hashing the most recent block header in the subledger 304. The state commitments may be submitted to the processing server 102 and included in a new block added to the global ledger 306, where state commitments may be stored in a STAT partition in the global ledger 306.

In cases where the sub-networks 110 are allowed to transfer the COIN between each other, an atomic swap may be performed. When an atomic swap is performed, the issuing authority 104 may serve as a moderator to ensure that the sub-network 110 transferring the COIN was issued a sufficient amount to make such a transfer. Information regarding the transfer may be reflected in a new base commitment that is provided to the general ledger 302 and to the global ledger 306 for storage in the BASE partition therein.

In embodiments where comp commitments may be collected, a validator 308 may be used to validate the information stored in a subledger 304. Such information may be included a comp commitment that is submitted to the processing server 102 by a sub-network node 112 operating the respective subledger or by the validator 308. The comp commitment may be stored in a new block added to the global ledger 306 where, if partitions are used, the comp commitments may be stored in a COMP partition included in the global ledger 306.

Exemplary Method for Maintaining a Consistent Blockchain Ledger

FIG. 4 illustrates a method 400 for maintaining a consistent blockchain ledger for storing commitments across multiple blockchains in a manner that is agnostic to the type of blockchain and scalable both vertically and horizontally for any number of blockchains.

In step 402, a blockchain (e.g., the global ledger 306) comprised of a plurality of blocks may be stored in a memory (e.g., the blockchain data 206, memory 218, etc.) of a processing server (e.g., the processing server 102), each block including at least a block header and one or more blockchain data values. In step 404, a base commitment may be received from a first node (e.g., general node 108) by a receiver (e.g., the receiving device 202) of the processing server, where the first node is included in a first blockchain network (e.g., the general network 106).

In step 406, a first new block may be generated by a processor (e.g., the generation module 212) of the processing server, the first new block including at least a first block header and the received base commitment. In step 408, the first new block may be stored in the blockchain in the memory of the processing server. In step 410, a state commitment may be received by the receiver of the processing server from an additional node (e.g., sub-network node 112) included in each of at least two additional blockchain networks (e.g., sub-networks 110).

In step 412, an additional new block may be generated by the processor of the processing server, where the additional new block includes at least an additional block header and each received state commitment. In step 414, the additional new block may be stored in the blockchain in the memory of the processing server.

In one embodiment, the state commitments may be received at a predetermined time. In some embodiments, each state commitment may be a hash value generated via application of a hashing algorithm to a header of a most recent block included in a blockchain associated with the respective additional blockchain network. In one embodiment, each of the at least two additional blockchain networks may include at least one public blockchain and at least one private blockchain. In some embodiments, the base commitment may be a hash value generated via application of a hashing algorithm to an issuance event describing issuance of cryptographic currency to the at least two additional blockchain networks.

In one embodiment, the method 400 may further include repeating, by the processing server, the second receiving, generating, and storing steps for a new state commitment from the additional node included in each of the at least two additional blockchain networks. In a further embodiment, the second receiving, generating, and storing steps may be repeated after a predetermined period of time. In some embodiments, the first new block and additional new block may be stored in separate partitions in a single block added to the blockchain.

Computer System Architecture

FIG. 5 illustrates a computer system 500 in which embodiments of the present disclosure, or portions thereof, may be implemented as computer-readable code. For example, the processing server 102 and back-end system of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein.

Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods maintaining a consistent blockchain ledger for storing commitments across multiple separate blockchains. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for maintaining a consistent blockchain ledger, comprising:
   receiving, by a receiver of the processing server, a base commitment from a first node included in a first blockchain network, said base commitment referencing a transmission of data to multiple, separate blockchain networks;
   generating, by a processor of the processing server, a first new block including at least the base commitment;
   receiving, by the receiver of the processing server, a state commitment from each blockchain network in the multiple, separate blockchain networks referenced by said base commitment, wherein the state commitments represent the states of the blockchains respectively associated with the multiple, separate blockchain networks; and
   generating, by the processor of the processing server, an additional new block including at least each received state commitment.

2. The method of claim 1, wherein the state commitments are received at a predetermined time.

3. The method of claim 1, wherein each state commitment is a hash value generated via application of a hashing algorithm to a header of a most recent block included in a blockchain associated with the respective blockchain network of the multiple, separate blockchain networks.

4. The method of claim 1, wherein each of the multiple, separate blockchain networks includes at least one public blockchain and at least one private blockchain.

5. The method of claim 1, wherein the base commitment is a hash value generated via application of a hashing algorithm to an issuance event describing issuance of cryptographic currency to the multiple, separate blockchain networks.

6. The method of claim 1, further comprising:
   repeating, by the processing server, the second receiving and generating steps for a new state commitment from each of the multiple, separate blockchain networks.

7. The method of claim 6, wherein the second receiving and generating steps are repeated after a predetermined period of time.

8. The method of claim 1, wherein the first new block and additional new block are stored in separate partitions in a single block added to the blockchain.

9. The method of claim 1, further comprising:
   storing, in a memory of the processing server, a blockchain including the first new block.

10. The method of claim 1, further comprising:
    storing, in a memory of the processing server, a blockchain including the additional new block.

11. A system for maintaining a consistent blockchain ledger, comprising:
    a processing server;
    a first node included in a first blockchain network; and
    multiple, separate blockchain networks, each including an additional node, wherein
    the processing server includes
      a receiver receiving a base commitment from the first node included in the first blockchain network, said base commitment referencing a transmission of data to the multiple, separate blockchain networks, and
      a processor generating a first new block including at least the base commitment received, wherein
    the receiver further receives a state commitment from each blockchain network in the multiple, separate blockchain networks referenced by said base commitment, wherein the state commitments represent the states of the blockchains respectively associated with the multiple, separate blockchain networks, and
    the processor further generates an additional new block including at least each received state commitment.

12. The system of claim 11, wherein the state commitments are received at a predetermined time.

13. The system of claim 11, wherein each state commitment is a hash value generated via application of a hashing algorithm to a header of a most recent block included in a blockchain associated with the respective blockchain network of the multiple, separate blockchain networks.

14. The system of claim 11, wherein each of the multiple, separate blockchain networks includes at least one public blockchain and at least one private blockchain.

15. The system of claim 11, wherein the base commitment is a hash value generated via application of a hashing algorithm to an issuance event describing issuance of cryptographic currency to the multiple, separate blockchain networks.

16. The system of claim 11, wherein the processing server repeats the second receiving and generating steps for a new state commitment from each of the multiple, separate blockchain networks.

17. The system of claim 16, wherein the second receiving and generating steps are repeated after a predetermined period of time.

18. The system of claim 11, wherein the first new block and additional new block are stored in separate partitions in a single block added to the blockchain.

19. The system of claim 11, wherein the processor further includes a memory configured to store a blockchain including the first new block.

20. The system of claim 11, wherein the processor further includes a memory configured to store a blockchain including the additional new block.

* * * * *